(12) United States Patent
Han (10) Patent No.: US 9,719,410 B2
(45) Date of Patent: Aug. 1, 2017

(54) ENGINE INTAKE PORT STRUCTURE

(71) Applicant: Doosan Infracore Co., Ltd., Incheon (KR)

(72) Inventor: Ku Yeon Han, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 69 days.

(21) Appl. No.: 14/655,515

(22) PCT Filed: Dec. 26, 2013

(86) PCT No.: PCT/KR2013/012192
§ 371 (c)(1),
(2) Date: Jun. 25, 2015

(87) PCT Pub. No.: WO2014/104750
PCT Pub. Date: Jul. 3, 2014

(65) Prior Publication Data
US 2015/0345420 A1    Dec. 3, 2015

(30) Foreign Application Priority Data

Dec. 26, 2012  (KR) .................. 10-2012-0152970
Dec. 26, 2013  (KR) .................. 10-2013-0163701

(51) Int. Cl.
*F02B 31/00*  (2006.01)
*F02B 31/02*  (2006.01)
(Continued)

(52) U.S. Cl.
CPC .............. *F02B 31/00* (2013.01); *F01L 1/265* (2013.01); *F02B 31/082* (2013.01);
(Continued)

(58) Field of Classification Search
CPC .. F02B 31/00; F02B 31/082; F02B 2031/006; F02B 31/02; F02B 31/085; F01L 1/265;
(Continued)

(56) References Cited

U.S. PATENT DOCUMENTS 4,121,544 A  * 10/1978  May ..................... F02B 19/08
                                                      123/263
4,354,463 A  * 10/1982  Otani ..................... F01L 3/06
                                                      123/188.14
(Continued)

FOREIGN PATENT DOCUMENTS

AT    EP 0527122    *  2/1993
AT    EP 0790398    *  8/1997  ............... F02F 1/42
(Continued)

OTHER PUBLICATIONS

Chinese Office Action dated Jun. 24, 2016 for Chinese Application No. 201380044988.5, 7 pages.
(Continued)

*Primary Examiner* — Thomas Moulis
*Assistant Examiner* — George Jin
(74) *Attorney, Agent, or Firm* — John D. Veldhuis-Kroeze; Westman, Champlin & Koehler, P.A.

(57) ABSTRACT

One exemplary embodiment of the present disclosure relates to an engine intake port structure. According to the engine intake port structure of the exemplary embodiment of the present disclosure, a chamfer is formed to be offset to either side from an end corner of an intake port. Accordingly, the inflow of a fuel gas is concentrated on a side in which an opening width of the chamfer is wide at the beginning of an opening stage when the intake port is opened/closed by a valve unit, and after the intake port is opened, the opening width is formed to be similar at four sides of the valve unit such that swirls formed in the fuel gas is weakened. That is,
(Continued)

complete combustion of the fuel can be anticipated since the length of time during which the fuel gas remains in a combustion chamber is extended.

6 Claims, 12 Drawing Sheets (51) Int. Cl.
| | | |
|---|---|---|
| *F02M 35/108* | (2006.01) | |
| *F02F 1/42* | (2006.01) | |
| *F02B 31/08* | (2006.01) | |
| *F01L 1/26* | (2006.01) | |
| *F02M 35/112* | (2006.01) | |
| *F01L 3/06* | (2006.01) | |
| *F01L 3/00* | (2006.01) | |

(52) U.S. Cl.
CPC .......... *F02F 1/4228* (2013.01); *F02F 1/4235* (2013.01); *F02M 35/1085* (2013.01); *F01L 3/00* (2013.01); *F01L 3/06* (2013.01); *F02B 2031/006* (2013.01); *F02M 35/112* (2013.01); *Y02T 10/146* (2013.01)

(58) Field of Classification Search
CPC ....... F01L 3/00; F01L 3/06; F01L 1/26; F01L 3/22; F02F 1/4228; F02F 1/4235; F02M 35/1085; F02M 35/112; F02M 35/1045; F01F 1/4228; F01F 1/4235
USPC .................................................. 123/306, 308
See application file for complete search history.

(56) References Cited

U.S. PATENT DOCUMENTS

| | | | | |
|---|---|---|---|---|
| 4,905,646 A * | 3/1990 | Tanahashi | .............. | F02M 26/01 123/184.45 |
| 5,479,889 A * | 1/1996 | Sato | .................. | F02B 31/00 123/188.14 |
| 5,603,299 A * | 2/1997 | Yuzuriha | ................ | F02B 31/00 123/308 |
| 5,676,107 A * | 10/1997 | Yuzuriha | ................ | F02B 31/00 123/302 |
| 5,765,525 A * | 6/1998 | Ma | ..................... | F02B 31/04 123/308 |
| 5,797,368 A * | 8/1998 | Kreuter | ............... | F01L 13/0047 123/308 |
| 5,870,993 A * | 2/1999 | Stellet | .................. | F01L 1/34 123/308 |
| 6,098,590 A * | 8/2000 | Kutschera | ................ | F01L 3/22 123/301 |
| 6,318,348 B1 * | 11/2001 | Xu | ........................ | F02B 17/00 123/308 |
| 6,321,715 B1 * | 11/2001 | Dong | ..................... | F01L 3/06 123/295 |
| 6,526,940 B2 * | 3/2003 | Ichikawa | ................ | F02B 31/02 123/188.14 |
| 6,799,551 B2 * | 10/2004 | Nakakita | ................ | F02M 26/01 123/279 |
| 7,357,117 B2 * | 4/2008 | Yoshikawa | ............... | F01L 3/06 123/188.14 |
| 7,434,564 B2 * | 10/2008 | Denger | ..................... | F01L 3/06 123/275 |
| 7,506,630 B2 * | 3/2009 | Denger | ................ | F02B 23/104 123/275 |
| 7,707,989 B2 * | 5/2010 | Andou | .................... | F02B 31/04 123/188.14 |
| 2015/0219006 A1 * | 8/2015 | Bittner | ........................ | 123/308 |

FOREIGN PATENT DOCUMENTS

| | | | | |
|---|---|---|---|---|
| AT | DE 10120303 A1 * | 11/2001 | .............. | F02B 31/00 |
| AT | EP 1251254 A2 * | 10/2002 | ......... | F02D 13/0261 |
| CN | 1522338 A | 8/2004 | | |
| DE | 1940806 A1 * | 8/1970 | .......... | F02F 1/4235 |
| DE | 3141663 A1 | 5/1983 | | |
| DE | 234998 A3 | 4/1986 | | |
| DE | 102009043479 A1 | 3/2011 | | |
| EP | 2108788 A1 | 10/2009 | | |
| FR | EP 1493910 A1 * | 1/2005 | .............. | F02B 31/02 |
| FR | 2887585 A1 * | 12/2006 | ................ | F01L 3/06 |
| FR | 2923865 A1 | 5/2009 | | |
| JP | 05-098972 * | 4/1993 | .............. | F02B 31/02 |
| JP | 05-098972 A | 4/1993 | | |
| JP | 2001012247 A | 1/2001 | | |
| JP | 2008-115771 A | 5/2008 | | |
| JP | 2009-057830 A | 3/2009 | | |
| JP | 2012-12939 * | 1/2012 | ................ | F02F 1/42 |
| KR | 10-2005-0039965 A | 5/2005 | | |
| KR | WO 2014104750 A1 * | 7/2014 | .............. | F01L 1/265 |

OTHER PUBLICATIONS

International Search Report with English Translation mailed Apr. 8, 2014 for corresponding International Application No. PCT/KR2013/012192, 5 pages.

European Search Report dated Oct. 26, 2016 for European Application No. 13866707.6, 6 pages.

* cited by examiner

ENGINE INTAKE PORT STRUCTURE

CROSS-REFERENCE TO RELATED APPLICATION

This Application is a Section 371 National Stage Application of International Application No. PCT/KR2013/012192, filed Dec. 26, 2013 and published, not in English, as WO 2014/104750 A1 on Jul. 3, 2014.

FIELD OF THE DISCLOSURE

The present disclosure relates to an engine intake port structure, and more particularly, to an engine intake port structure that weakens a swirl flow of intake air during an intake stroke so as to extend a waiting time in a combustion chamber.

BACKGROUND OF THE DISCLOSURE

Generally, an engine includes a cylinder block and a cylinder head block. In the cylinder block, a cylinder is formed, and in the cylinder head block, an intake port and an exhaust port are formed. Further, in the cylinder head block, an injector and a glow plug are provided. That is, air is introduced into a combustion chamber through the intake port and fuel is injected by the injector, so that the air and the fuel are mixed to form a mixed gas, and the mixed gas is exploded and burned by a compression stroke of a piston. After being burned, the mixed gas is discharged as an exhaust gas through the exhaust port.

Hereinafter, referring to FIG. 1 to FIG. 3, a conventional engine intake port structure will be described.

Figure 1:
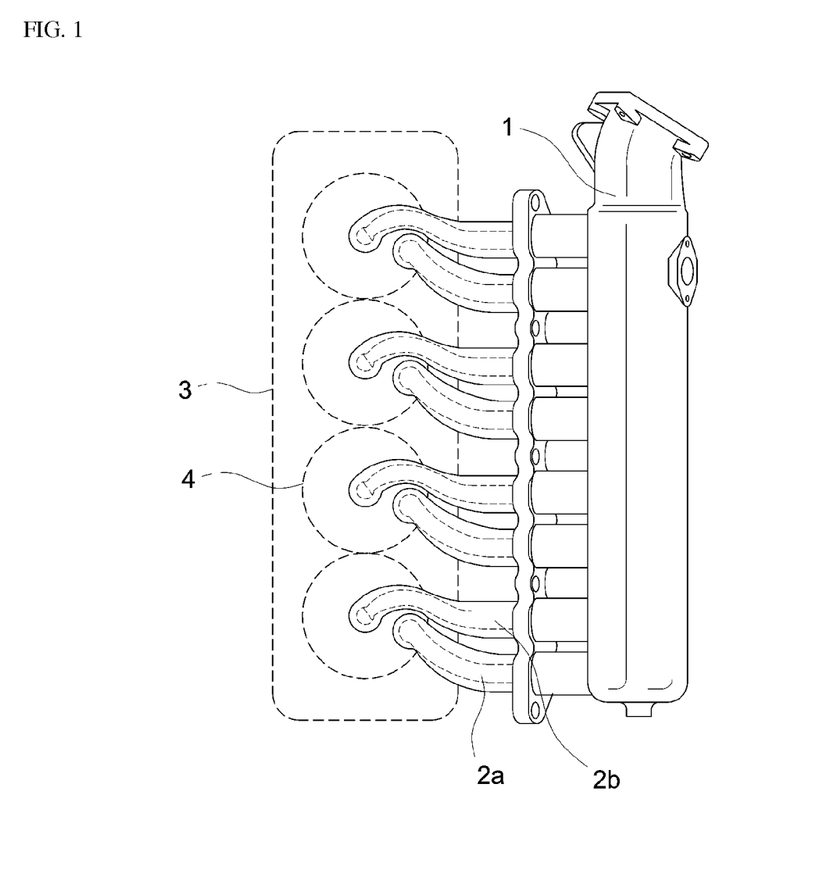
FIG. 1 is a diagram provided to explain a conventional engine intake port structure.
Figure 2:
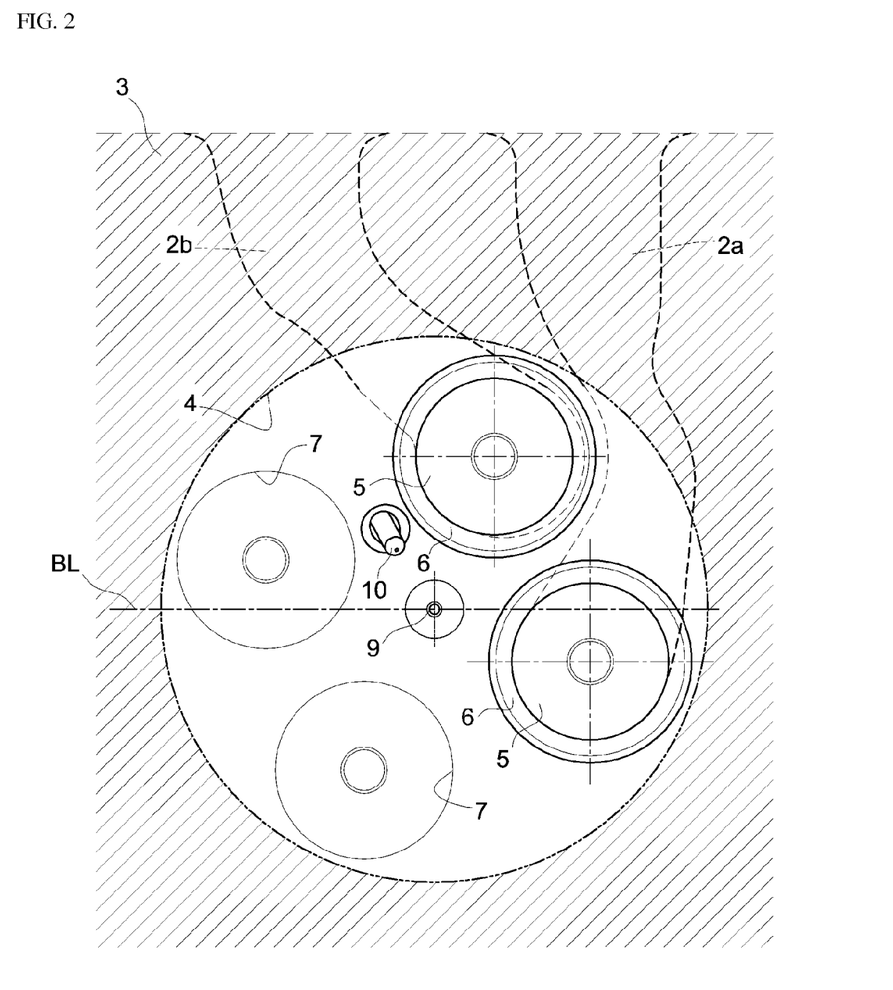
FIG. 2 is a bottom view of a cylinder head block provided to explain the conventional engine intake port structure.

FIG. 1 is a diagram provided to explain a conventional engine intake port structure. FIG. 2 is a bottom view of a cylinder head block provided to explain the conventional engine intake port structure. FIG. 3 is a longitudinal cross-sectional view of an intake port provided to explain the conventional engine intake port structure.

As illustrated in FIG. 1, an intake manifold 1 is provided on one side of a cylinder head block 3. The intake manifold 1 is configured to suck fresh air from the outside or to be supplied with intake air by a turbocharger. The intake manifold 1 and a combustion chamber 4 are connected to each other by first and second intake ports 2a and 2b. To be more specific, in the cylinder head block 3, an intake port 5 and an exhaust port 7 are formed, and the intake port 5 and the exhaust port 7 are disposed within the combustion chamber 4.

The intake port 5 is connected to the above-described first and second intake ports 2a and 2b, and a valve unit 8 is installed. That is, if the valve unit 8 is opened at the intake port 5, fresh air is supplied into the combustion chamber, and if the valve unit 8 closes the intake port 5, the combustion chamber is sealed.

Meanwhile, a valve sheet 6 is provided at the intake port 5. When the valve unit 8 is closed, the valve sheet 6 is brought into close contact with the valve unit 8 so as to maintain a sealed state of the combustion chamber.

Further, after a mixed gas including air and fuel is burned, an exhaust port 7 is configured to exhaust the gas. Although not illustrated in detail, the exhaust port 7 is provided with an exhaust valve for opening/closing the exhaust port 7.

Furthermore, in the cylinder head block 3, an injector 9 is installed at a central portion of the combustion chamber 4. The injector 9 is configured to inject fuel to the combustion chamber.

Also, in the cylinder head block 3, a glow plug 10 may be installed so as to be close to the injector 9. The glow plug 10 is used to warm up fuel.

Meanwhile, intake air may be supplied to the intake manifold 1. Such compressed air may have a swirl depending on a shape of a flow path while passing through the first and second intake ports 2a and 2b. The swirl enables the intake air and fuel to be mixed well in the combustion chamber.

Figure 3:
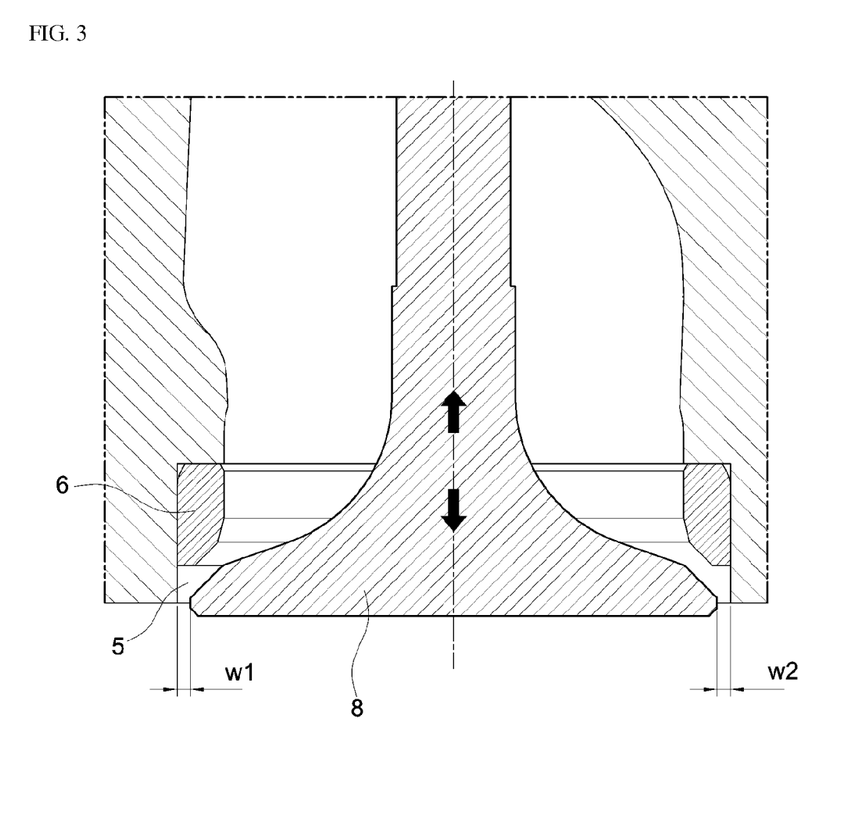
FIG. 3 is a longitudinal cross-sectional view of an intake port provided to explain the conventional engine intake port structure.

Meanwhile, as illustrated in FIG. 3, in the conventional engine intake port structure, a corner at an end of the intake port 5 may be formed in a linear fashion without a particular shape, or even if a chamber is formed, the chamber is provided in a concentric manner with an inner diameter of the intake port 5.

Therefore, when the valve unit 8 is opened at the intake port 5, opening widths w1 and w2 are equal to each other at four sides of the valve unit 8 regardless of a position of a level of the valve unit 8.

Meanwhile, at the time when the valve unit 8 is opened, the opening widths w1 and w2 are narrow, and thus, the intake air is introduced into the combustion chamber at a high pressure while the swirls are formed in the intake air. The intake air introduced as such flows and is mixed with fuel.

Further, a glow plug 10 may be provided in the combustion chamber 4. That is, the intake air may be supplied toward a space where the glow plug 10 is disposed. Thus, the intake air may cause interference with the glow plug 10 and the swirl may be randomly scattered, so that the intake air and the fuel may not be mixed well.

Otherwise, as one of important considerations in developing a combustion unit of an engine, a vortex flow, i.e., a swirl flow, of air sucked into a combustion chamber is important. This is because only when the swirl flow of the intake air is big enough, the air and fuel can be smoothly mixed and smoke can be reduced.

As components for generating a swirl, there are the first and second intake ports 2a and 2b. The first intake port 2a may be provided as a helical port, so that a swirl is generated while the intake air passes through the first intake port 2a. Further, the second intake port 2b is disposed such that the intake air can be introduced in a tangential direction from an edge of the combustion chamber, and, thus, the intake air forms a swirl itself while passing through the second intake port 2b.

However, as described above, in order to generate swirls by the first and second intake ports 2a and 2b, an air volume over a certain amount needs to be secured. For this reason, a swirl (vortex) flow ratio is proportional to an opening width of an intake valve. That is, if the opening width of the intake valve is small, the swirl flow ratio is low, whereas if the opening width of the intake valve is large, the swirl flow ratio is high.

Therefore, the swirl flow ratio increases as the opening width of the intake valve increases in the middle of an intake stroke. However, toward the end of the intake stroke, as the intake valve is closed, an air volume decreases and a swirl of air sucked through an intake port becomes gradually smaller. Further, if the length of time during which air remains in a combustion chamber is short due to a swirl flow, there may be a problem of incomplete combustion.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

An embodiment of the present disclosure is suggested to solve the above-described problem. An object of the present disclosure is to provide an engine intake port structure in which a chamfer is formed to be offset to an end corner of an intake port, and, thus, a swirl flow of intake air is weakened at the end of an intake stroke so as to allow the air to remain in a combustion chamber for a long time.

An engine intake port structure according to the present disclosure in order to achieve the above-described technical object includes: a cylinder head block 100 including an intake port 110 and an exhaust port inlet 140; an injector 182 installed at a central portion of a combustion chamber 170 in the cylinder head block 100 and configured to inject fuel; and a valve unit 160 installed in the cylinder head block 100 and configured to open and close the intake port 110, wherein at an end corner of the intake port 110, a chamfer 130 is formed to be offset (a) with respect to the center of the intake port 110, and when the intake port 110 is opened/closed by the valve unit 160, introduction of intake air is concentrated on a side in which an opening width of the chamfer 130 is wide at the beginning of an opening stage, and after the intake port 110 is opened, opening widths are formed to be similar at four sides of the valve unit 160, so that a swirl formed in the intake air is weakened.

Further, in the engine intake port structure according to an exemplary embodiment of the present disclosure, the intake port 110 may be provided in multiple as first and second intake ports 111 and 112, and at an end corner of the first intake port 111, a first chamfer 131 may be formed to be offset (a) with respect to the center of the first intake port 111 and at an end corner of the second intake port 112, a second chamfer 132 may be formed to be offset (a) with respect to the center of the second intake port 112.

Furthermore, in the engine intake port structure according to an exemplary embodiment of the present disclosure, offset directions D and D1 of the first chamfer 131 may be opposite to offset directions D and D2 of the second chamfer 132 by 180 degrees.

Also, in the engine intake port structure according to an exemplary embodiment of the present disclosure, when a virtual line connecting the center of the combustion chamber to the center of another adjacent combustion chamber is defined as a base line BL, the offset directions D of the first and second chamfers 131 and 132 may have torsion angles b1 and b2, respectively, with respect to the base line BL.

Further, in the engine intake port structure according to an exemplary embodiment of the present disclosure, the intake port 110 may be provided in multiple as first and second intake ports 111 and 112, and the first intake port 111 may be connected to a first intake port outlet 121 and the second intake port 112 may be connected to a second intake port outlet 122, and the first intake port outlet 121 may be a helical port formed in a helical direction with respect to the combustion chamber 170 and the second intake port outlet 122 may be a tangential port formed in a tangential direction with respect to the combustion chamber 170.

Furthermore, a diesel engine intake port structure according to another exemplary embodiment of the present disclosure which is formed to have torsion to control a swirl flow of a mixed gas includes: a cylinder head block 100 including a first intake port 111 and a second intake port 112 adjacent to the first intake port 111; first and second intake port outlets 121 and 122 connected to the intake ports and configured to suck air; valve sheet units 160 provided in the cylinder head block 100 and installed between the first and second intake port outlets 121 and 122 and the first and second intake ports 111 and 112; and chamfers 130 which are formed such that an inclination angle toward a combustion chamber from the environs of the first and second intake ports 111 and 112 is changed, wherein an inclination direction of the chamfer 130 formed at the first intake port 111 is opposite to an inclination direction of the chamfer 130 formed at the adjacent second intake port 112.

Further, in the diesel engine intake port structure according to an exemplary embodiment of the present disclosure, the first and second intake port outlets 121 and 122 may include a helical port installed in a helical shape in the cylinder head block 100 and a tangential port arranged in a tangential direction at an edge of the combustion chamber.

Furthermore, in the diesel engine intake port structure according to an exemplary embodiment of the present disclosure, the inclination direction of the chamfer 130 formed at the first intake port 111 may be twisted by 30 degrees in an anticlockwise direction based on a longitudinal direction of the cylinder head block 100 and the inclination direction of the chamfer 130 formed at the second intake port 112 may be twisted by 210 degrees in the anticlockwise direction based on the longitudinal direction of the cylinder head block 100.

A first effect of the present disclosure is that a swirl flow of intake air can be weakened by a simple structure. A second effect of the present disclosure is that efficiency of an engine can be improved and contaminants in an exhaust gas can be reduced by increasing mixability between fuel and air.

DESCRIPTION OF MAIN REFERENCE NUMERALS OF THE DRAWINGS

1: Intake manifold
2a, 2b: First and second intake ports
3: Cylinder head block
4: Combustion chamber
5: Intake port
6: Valve sheet unit
7: Exhaust port
8: Valve unit
9: Injector
10: Glow plug
w1, w2: First and second opening widths
100: Cylinder head block
110: Intake port
111, 112: First and second intake ports
121, 122: First and second intake ports
130: Chamfer
131, 132: First and second chamfers
140: Exhaust port
142: Exhaust port
150: Valve unit
160: Valve sheet unit
170: Combustion chamber
180: Injector installation hole
182: Injector
190: Glow plug installation hole
192: Glow plug
BL: Base line (Line connecting the center of a combustion chamber and the center of another combustion chamber)
a: Offset distance
b1, b2: Torsion angle with respect to base line
c1, c2: First and second opening widths

DETAILED DESCRIPTION

The advantages and characteristics of the present disclosure and methods for achieving the same will become clear from the embodiments set forth in detail below with reference to the attached drawings.

Hereinafter, exemplary embodiments of the present disclosure will be described in detail with reference to the accompanying drawings. It should be understood that the following exemplary embodiments are provided for illustration to help improve understanding of the present disclosure, and the invention may be embodied in many different forms from the exemplary embodiments set forth herein. In the following description, a detailed explanation of known related functions and constructions may be omitted to avoid unnecessarily obscuring the subject matter of the present disclosure. Further, the drawings are not necessarily to scale and certain features may be exaggerated in order to more clearly illustrate and explain the present disclosure.

Also, the terms described below are established taking into account the functions of the present disclosure. Since the terms may be changed in accordance with manufacturer's intention or practice, the meanings of the terms should be defined based on the whole contents of the specification.

Throughout the whole specification, the same reference numerals denote the same elements.

Hereinafter, an engine intake port structure according to an exemplary embodiment of the present disclosure will be described with reference to FIG. 4 to FIG. 8.

Figure 4:
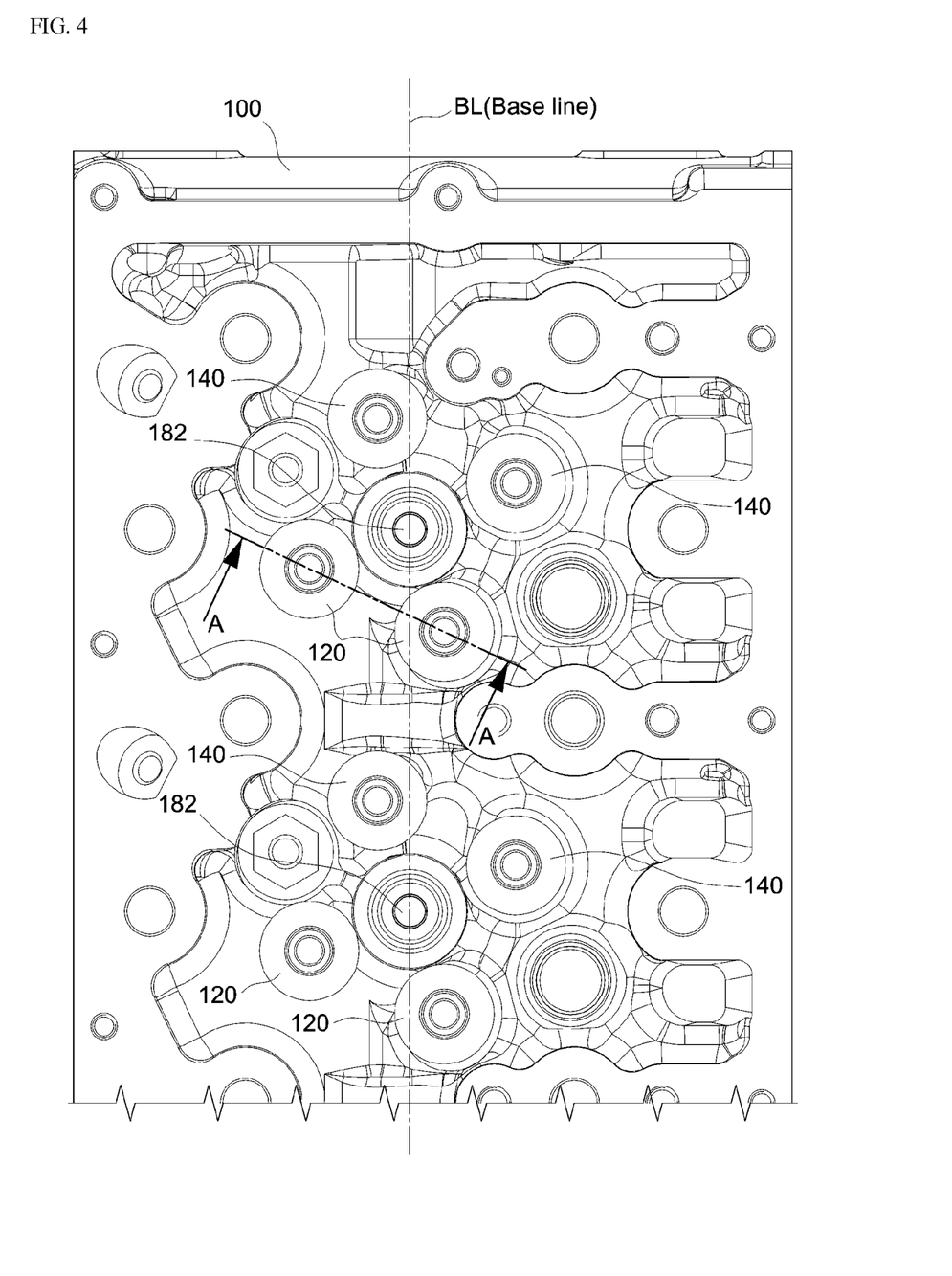
FIG. 4 and FIG. 5 are bottom views of a cylinder head block provided to explain an engine intake port structure according to an exemplary embodiment of the present disclosure.
Figure 5:
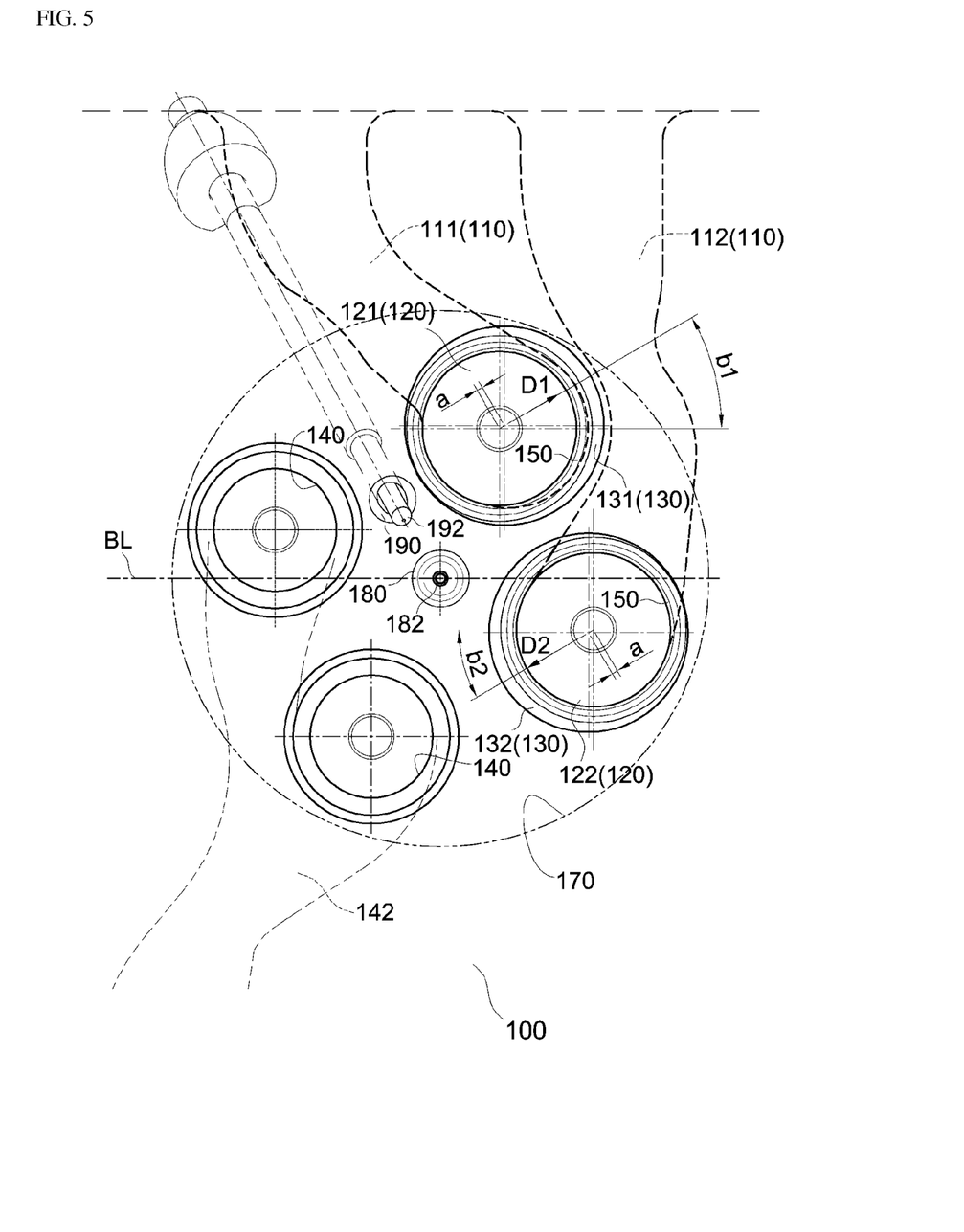
Figure 6:
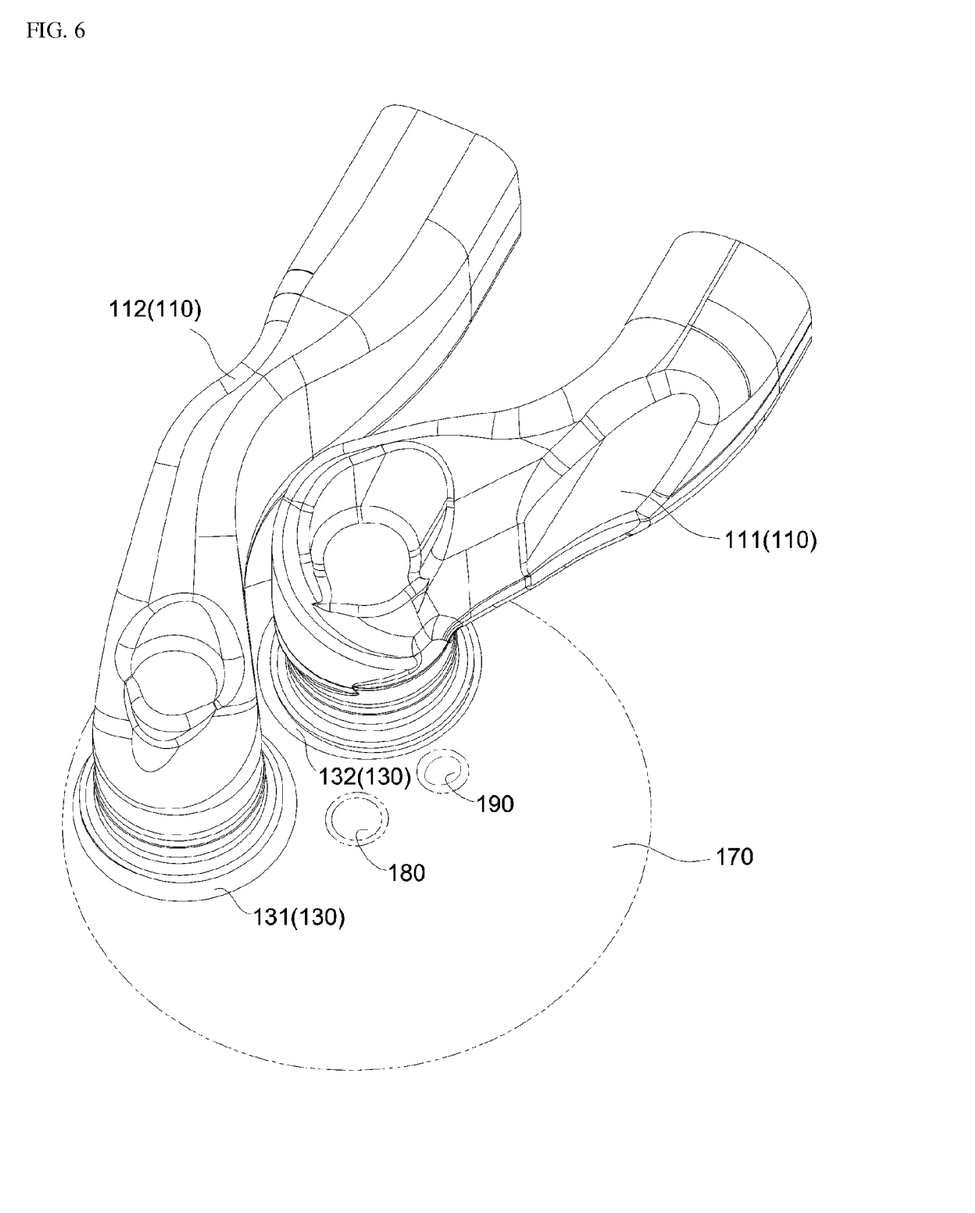
FIG. 6 is a diagram provided to explain an intake port formed at a cylinder head block in an engine intake port structure according to an exemplary embodiment of the present disclosure.
Figure 7:
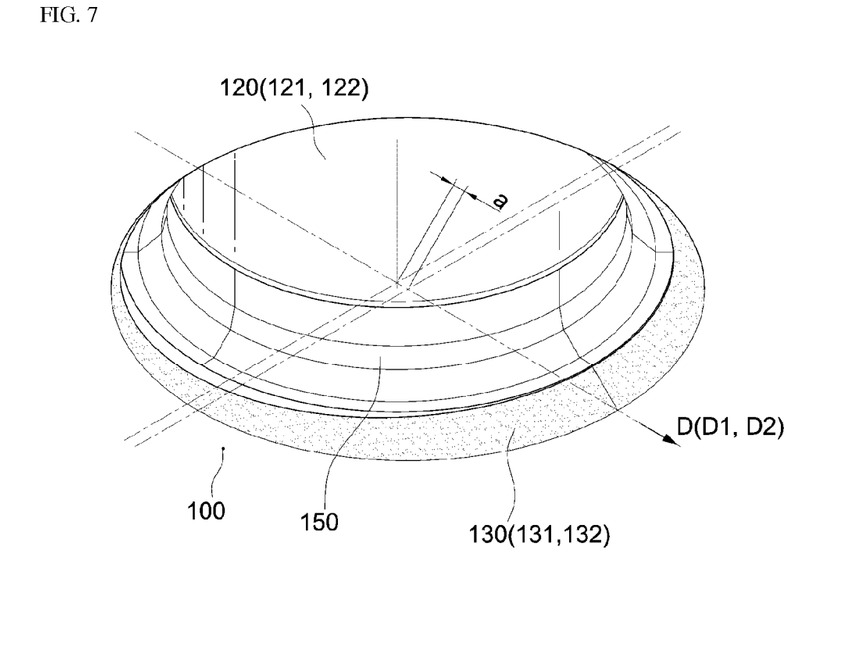
FIG. 7 is a diagram provided to explain a chamfer formed at an intake port in an engine intake port structure according to an exemplary embodiment of the present disclosure.
Figure 8:
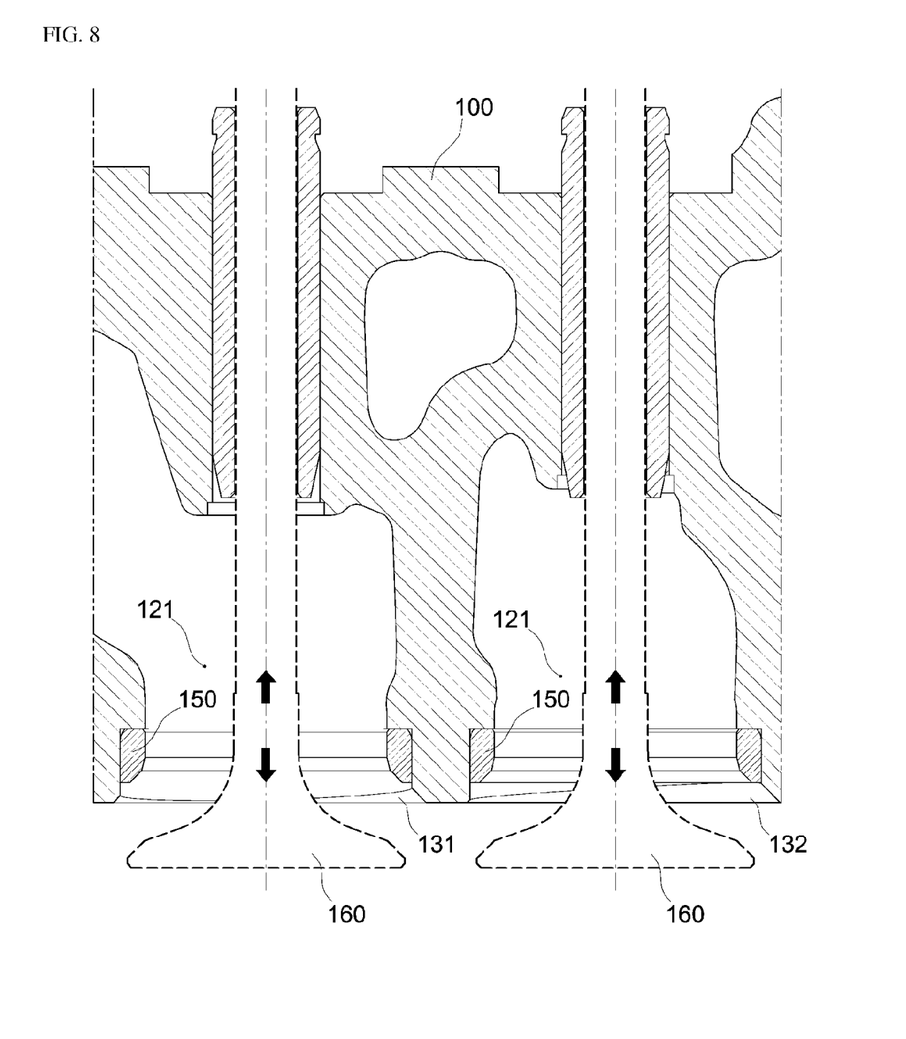
FIG. 8 is a cross-sectional view taken along a line A-A of FIG. 7.

FIG. 4 and FIG. 5 are bottom views of a cylinder head block provided to explain an engine intake port structure according to an exemplary embodiment of the present disclosure. FIG. 6 is a diagram provided to explain an intake port formed at a cylinder head block in an engine intake port structure according to an exemplary embodiment of the present disclosure. FIG. 7 is a diagram provided to explain a chamfer formed at an intake port in an engine intake port structure according to an exemplary embodiment of the present disclosure. FIG. 8 is a cross-sectional view taken along a line A-A of FIG. 7.

As illustrated in FIG. 4, at a bottom surface of a cylinder head block 100, an intake port 110 and an intake port 120 are formed. Further, at a central portion of a combustion chamber, an injector 182 is provided. Meanwhile, an engine may include multiple combustion chambers, and for example, four, six or more combustion chambers may be provided.

Meanwhile, a cylinder may be formed to be upright or formed into a V-shape depending on the specifications of the engine. If the cylinder is formed to be upright, multiple combustion chambers may be arranged in a row. Further, even if the cylinder is formed into a V-shape, combustion chambers may be arranged in a row. In an exemplary embodiment of the present disclosure, a line connecting the center of a combustion chamber to the center of another combustion chamber will be defined and explained as a base line BL.

FIG. 5 is a diagram simply illustrating one combustion chamber 170 in the cylinder head block 100.

As illustrated in FIG. 5, the intake port 110 and an exhaust port 142 are formed in the cylinder head block 100. The intake port 110 may be provided in multiple as first and second intake ports 111 and 112.

At an end portion of the intake port 110, the intake port 120 is formed. That is, at end portions of the first and second intake ports 111 and 112, first and second intake port outlets 121 and 122 are formed, respectively.

Meanwhile, although not specifically illustrated, the intake port 110 is connected to an intake manifold so as to be supplied with intake air. As a result, the intake air is supplied to the combustion chamber 170 from the intake port 120 via the intake port 110.

Further, at an end portion of the exhaust port 142, an exhaust port inlet 140 is formed. The exhaust port inlet 140 is configured to discharge an exhaust gas after combustion is completed in the combustion chamber 170.

Within the cylinder head block 100, an injector installation hole 180 is formed at a central portion of the combustion chamber 170. At the injector installation hole 180, an injector 182 is installed. The injector 182 is configured to inject fuel into the combustion chamber.

Further, in the cylinder head block 100, a glow plug installation hole 190 is formed between the intake port 120 and the exhaust port inlet 140. At the glow plug installation hole 190, a glow plug 192 is installed. The glow plug 192 is configured to warm up fuel to assist ignition.

Meanwhile, as illustrated in FIG. 5 and FIG. 7, at an end corner of the intake port 120, a chamfer 130 is formed. The chamfer 130 may be formed to be offset to either side (refer to a). Herein, the chamfer refers to an inclined portion or an inclined plane.

Further, the chamfer 130 may have various inclination angles and thus may have a gentle inclination angle or a sharp inclination angle. Furthermore, an inclination plane forming the chamfer 130 may have a flat surface or may have a bent or a protrusion in some cases.

The chamfer 130 may be formed to have a right angle or an acute angle, preferably 45 degrees, with respect to an axis of the intake port 120.

If the inclination angle of the chamfer 130 is equal to or greater than 45 degrees, a swirl flow is sharply reduced, and if the inclination angle is equal to or less than 45 degrees, a swirl flow is gradually reduced.

Figure 9:
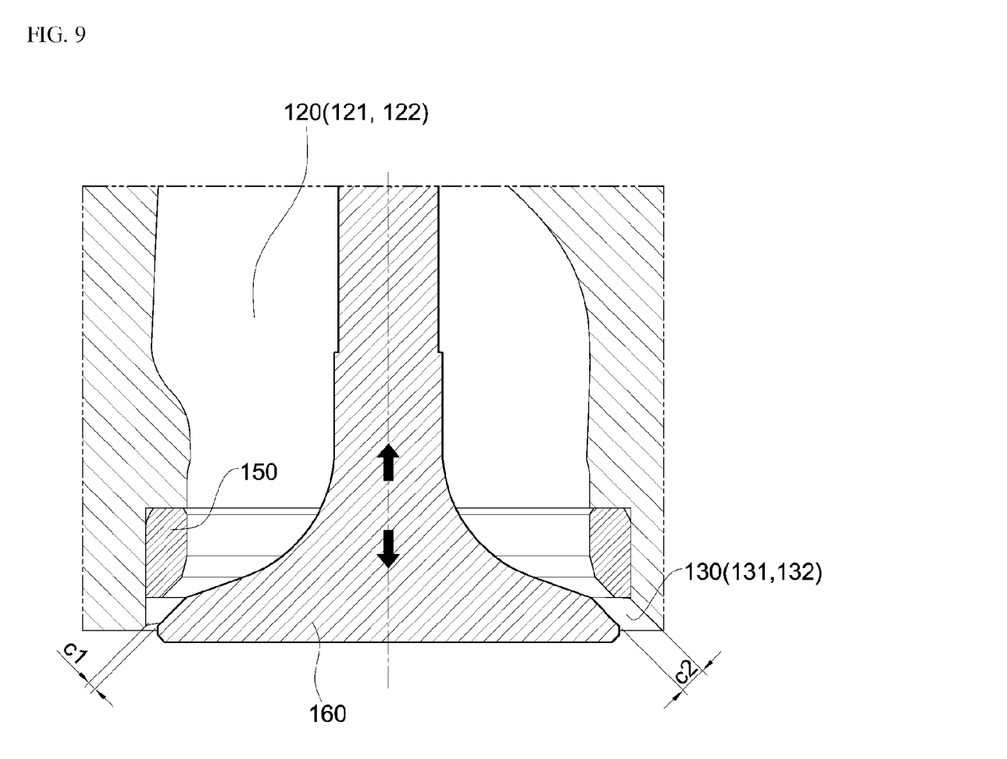
FIG. 9 and FIG. 10 are diagrams provided to explain an example where an intake port is opened/closed by a valve unit in an engine intake port structure according to an exemplary embodiment of the present disclosure.

Thus, as illustrated in FIG. 9, when the intake port 110 is opened/closed by the valve unit 160, introduction of intake air is concentrated on a side in which an opening width of the chamfer 130 is wide at the beginning of an opening stage or at the end of a closing stage. There is made a difference in opening width at four sides of the valve unit 160 due to the chamfer 130. That is, a flow of an air volume toward a side in which an opening width c1 is narrow is suppressed, and an air volume toward a side in which an opening width c2 is wide is concentrated.

Figure 10:
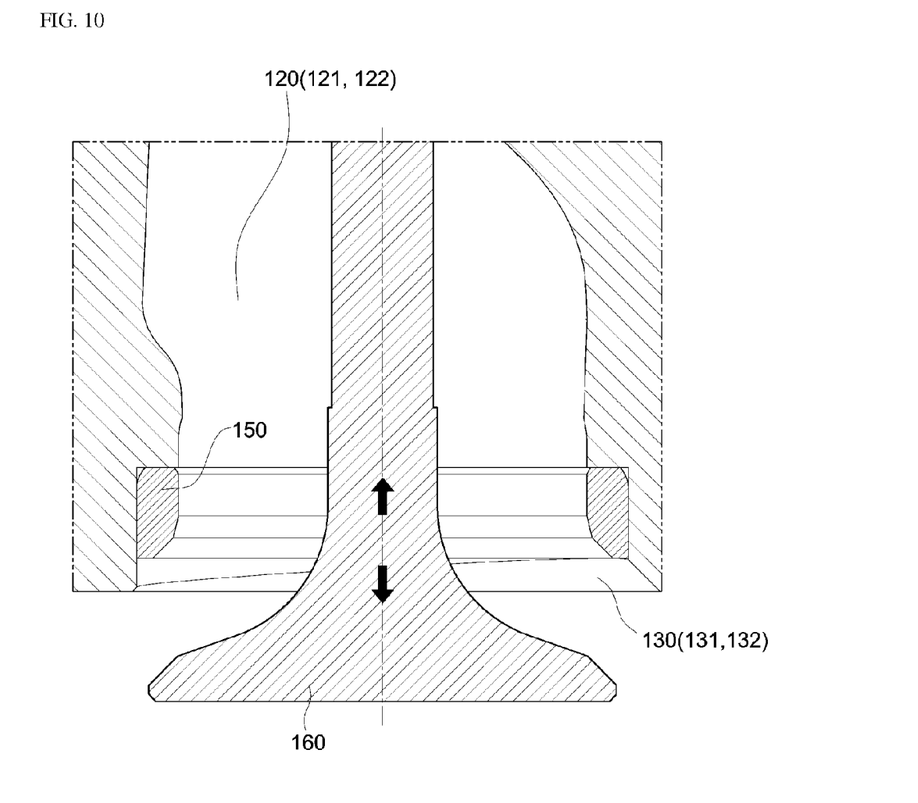

Meanwhile, after the intake port 120 is opened, as illustrated in FIG. 10, opening widths are formed to be similar at four sides of the valve unit 160, and, thus, an air volume is not concentrated on any particular portion but can be uniformly introduced. That is, a swirl formed in the intake air is weakened.

Otherwise, an offset distance a may be in a range of 0.5 mm to 3 mm. If the offset distance a is too short, an effect caused by the chamfer 130 is reduced, and, thus, preferably, the offset distance a may be 0.5 mm or more. Otherwise, if the offset distance a is too long, when the cylinder head block 120 and the cylinder block are combined to form the combustion chamber 170, a gap may be formed. Therefore, preferably, the offset distance a may be 3 mm or less. Further, the offset distance a may vary in size depending on the specifications of the engine.

Further, the intake port 110 may be provided in multiple as the first and second intake ports 111 and 112. At an end corner of the first intake port 111, a first chamfer 131 is formed to be offset (a) with respect to the center of the first intake port 111. At an end corner of the second intake port 112, a second chamfer 132 is formed to be offset (a) with respect to the center of the second intake port 112. That is, the chamfers 130 are formed at the two intake ports 120, respectively. Thus, an effect of the chamfers 130 on the respective intake ports 120 can be anticipated.

Meanwhile, the first chamfer 131 and the second chamfer 132 may be equal to or different from each other in an inclination angle or a shape.

Further, in the engine intake port structure according to an exemplary embodiment of the present disclosure, an offset direction D1 of the first chamfer 131 may be opposite to an offset direction D2 of the second chamfer 132 by 180 degrees. Thus, swirls are introduced into the combustion chamber 170 through two places, and interference between these two swirls can be minimized. In addition, if two swirls are introduced in directions facing each other, the swirls may be rapidly dissipated due to mutual interference. However, in an exemplary embodiment of the present disclosure, the offset directions of the chamfers are arranged to be opposite to each other, and, thus, mutual interference between two swirls can be minimized and mixing of air and fuel can be further promoted by the swirls.

Otherwise, the offset directions D, D1, and D2 of the first and second chamfers 131 and 132 may have torsion angles b1 and b2, respectively, with respect to the base line BL. An offset direction has a huge effect on a direction in which intake air is introduced when an opening width of the valve is relatively narrow. That is, which direction the offset direction D is set to makes a big difference in an effect of swirls.

The offset direction D1 of the first chamfer 131 may be a direction twisted with respect to the base line BL by a first angle b1 from a bottom view directly showing a bottom surface of the cylinder head block 100.

In the same manner, the offset direction D2 of the second chamfer 132 may be a direction twisted with respect to the base line BL by a second angle b1 from the bottom view directly showing the bottom surface of the cylinder head block 100.

Meanwhile, the first and second angles b1 and b2 may be parallel to the base line BL or may be smaller than 30 degrees. To be more specific, the first angle b1 may be within 30 degrees in an anticlockwise direction with respect to the base line BL from a direction in which the intake port 120 can be directly seen from the combustion chamber 170. Thus, intake air introduced through the first intake port outlet 121 can smoothly maintain swirls within the combustion chamber 170.

Further, the second angle b2 may be within 30 degrees in the anticlockwise direction with respect to the base line BL from the direction in which the intake port 120 can be directly seen from the combustion chamber 170. Thus, intake air introduced through the second intake port outlet 122 can smoothly maintain swirls within the combustion chamber 170.

For example, if the first angle b1 of the first intake port outlet 121 is twisted by 30 degrees in an anticlockwise direction, the second angle b2 of the second intake port outlet 122 can be twisted by 210 degrees in the anticlockwise direction.

Figure 12:
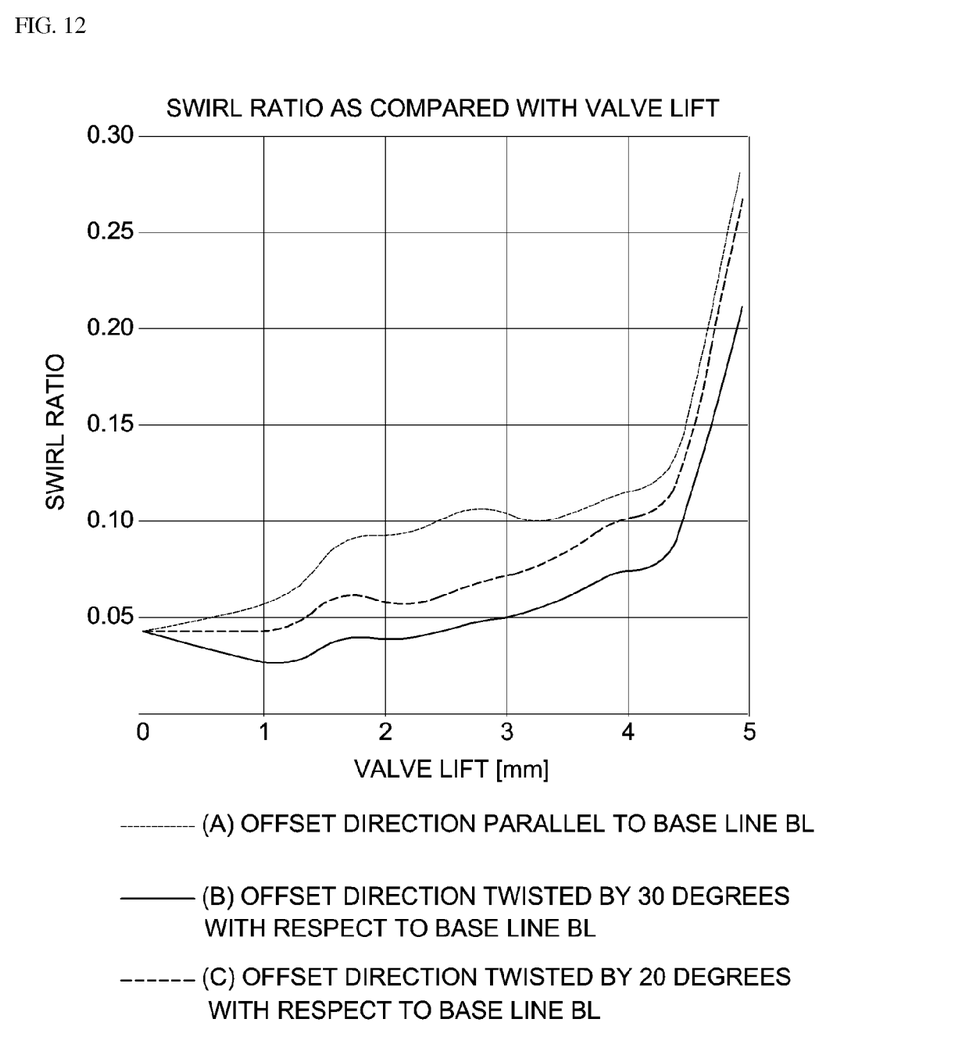
FIG. 12 is a diagram provided to explain a swirl ratio as compared with a valve lift when offset directions of first and second chamfers have torsion angles, respectively, with respect to a base line BL in an engine intake port structure according to an exemplary embodiment of the present disclosure.

Details thereof will be described with reference to FIG. 12. FIG. 12 is a diagram provided to explain a swirl ratio as compared with a valve lift when offset directions of first and second chamfers have torsion angles, respectively, with respect to a base line BL in an engine intake port structure according to an exemplary embodiment of the present disclosure.

FIG. 12 illustrates first, second, and third examples. In the first example, the offset direction D is parallel to the base line BL. In the second example, the offset direction D is twisted by 30 degrees with respect to the base line BL. In the third example, the offset direction D is twisted by 20 degrees with respect to the base line BL. Meanwhile, when the chamfer is formed in a concentric manner without being offset, there is little change in swirl ratio.

Meanwhile, FIG. 12 illustrates an example where a valve lift is 0 in a closed state and 5 mm in a maximum open state. Hereinafter, there will be described an example where a valve lift is set to 0% in a closed state and 100% in a maximum open state.

According to the first example (a), it can be seen that a swirl ratio is gradually and continuously increased from a time when the valve unit is opened, and when a valve lift reaches 90%, the swirl ratio is sharply increased. That is, according to the first example (a), it can be seen that since the first and second chamfers 131 and 132 are formed, the swirl ratio can be reduced.

According to the second example (b), a swirl ratio is decreased at the beginning of an opening stage of the valve unit. Meanwhile, the swirl ratio is weakened until a valve lift reaches about 25%, and when the valve lift is 25% or more, the swirl ratio is gradually increased. When the valve lift reaches about 90%, the swirl ratio tends to be increased. In particular, in the second example (b) as compared with the first example (a), the swirl ratio is remarkably low throughout the section of the valve lift.

According to the third example (c), there is a slight change in a swirl ratio at the beginning of an opening stage of the valve unit, and when a valve lift reaches about 25%, the swirl ratio is gradually increased, and when the valve lift reaches about 90%, the swirl ratio tends to be increased. However, it can be seen that the third example (c) exhibits a weakened swirl ratio as compared with the first example (a) but exhibits a relatively high swirl ratio as compared with the second example (b).

As described, it can be seen that a swirl ratio may vary depending on a torsion angle of the offset directions D, D1, and D2 of the first and second chamfers 131 and 132. It can be seen that particularly when the torsion angle of the offset directions D, D1, and D2 is 30 degrees, the effect is highest.

The intake port 110 will be described with reference to FIG. 6. As described above, the intake port 110 may be provided in multiple as the first and second intake ports 111 and 112.

The first intake port 111 may be a tangential port, and an introduction direction of an air current may be a tangential direction of the combustion chamber 170. Thus, if air is introduced into the combustion chamber 170 through the first intake port outlet 121 via the first intake port 111, the air naturally forms a swirl within the combustion chamber 170.

The second intake port 112 may be a helical port provided in a helical shape. Thus, air forms a swirl itself while passing through the second intake port 112, and the air is introduced into the combustion chamber 170 in a swirl state while passing through the second intake port outlet 122.

That is, the first and second intake ports 111 and 112 form a swirl in a flow of air, thereby promoting mixing of air and fuel within the combustion chamber 170.

Hereinafter, an example where an opening width of a valve is changed depending on opening/closing of the valve unit 160 in the engine intake port structure according to an exemplary embodiment of the present disclosure will be described in more detail.

FIG. 9 and FIG. 10 are diagrams provided to explain an example where an intake port is opened/closed by a valve unit in an engine intake port structure according to an exemplary embodiment of the present disclosure.

FIG. 9 illustrates the valve unit 160 at the intake port 120 right after being opened or right before being closed. As illustrated in FIG. 9, the chamfer 130 makes a difference in a valve lift. That is, it can be seen that a much wider space is formed on a side c2 in which the chamfer 130 is offset rather than a side c1 in which the chamfer 130 is not offset. Thus, an air volume may be concentrated on the side c2 in which the chamfer 130 is offset, and a flow of an air volume may be relatively small on the side in which the chamfer 130 is not offset.

FIG. 10 is a diagram illustrating that the valve unit 160 is sufficiently opened at the intake port 120. As illustrated in FIG. 10, it can be seen that all of the valve opening widths in the valve unit 160 are increased to be similar in size. If the valve opening widths become similar and increased as such, an orifice effect disappears, and a swirl is not concentrated on any side of four sides of the valve unit 160 but is favorably supplied into the combustion chamber 170.

Figure 11:
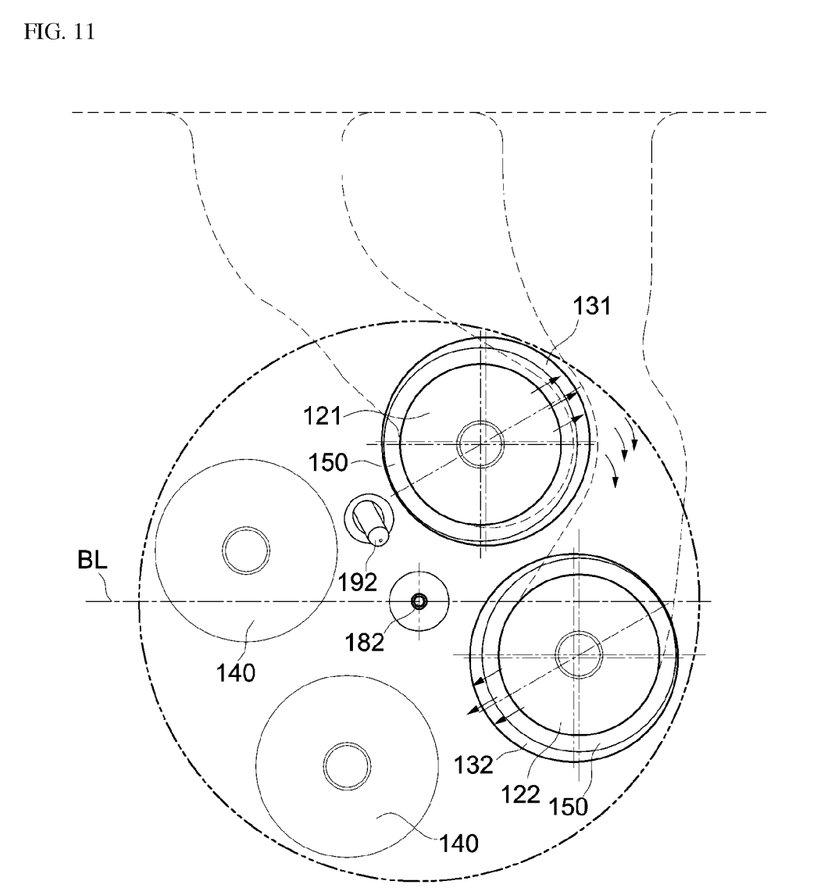
FIG. 11 is a diagram provided to explain a direction of a swirl effect in an engine intake port structure according to an exemplary embodiment of the present disclosure.

Hereinafter, an effect of a swirl will be described with reference to FIG. 11. FIG. 11 is a diagram provided to explain a direction of a swirl effect in an engine intake port structure according to an exemplary embodiment of the present disclosure.

Since the chamfer 130 is formed to be offset, a space is secured on any one side, and air is introduced into the combustion chamber through the space. In FIG. 11, as for a direction of a swirl effect, an air current introduced into the combustion chamber 170 through the first intake port outlet 121 by the first chamfer 131 is supplied diagonally to a wall surface of the combustion chamber 170. Meanwhile, a flow of an air current is limited on the opposite side, which achieves an effect similar to forming a virtual partition wall.

Thus, a swirl introduced through the first intake port outlet 121 does not interfere with the glow plug 192.

Further, an air current introduced into the combustion chamber 170 through the second intake port outlet 122 by the second chamfer 132 may proceed toward the middle of the center of the combustion chamber 170 and an inner wall of the combustion chamber 170. Thus, a swirl promotes mixing of the intake air and fuel.

Meanwhile, if a swirl acts right before the valve unit 160 closes the intake port 120 or right after the valve unit 160 opens the intake port 120, a flow rate can be further increased due to an orifice effect. However, since the chamfer 130 is formed to be offset, air flows into the space secured by offset and a swirl flow is weakened in the meantime.

Further, the engine intake port structure according to the present disclosure may be used in an engine of a construction machine which is not equipped with a diesel particulate filter (DPF).

If air sucked into the combustion chamber 170 through the intake port 110 by the chamfers 130 formed at the bottom of the first and second intake port outlets 121 and 122 is introduced into the combustion chamber 170 through the intake valve 160, a swirl flow is weakened.

A vortex (swirl) caused by the chamfer 130 is generated at a space adjacent to the intake valve as such, and, thus, the swirl is further strengthened at the end of the intake stroke. That is, if the intake valve is closed at the end of the intake stroke, a gap between the intake valve and the intake port becomes narrow and a flow rate is increased. The swirl is weakened by the chamfers 130 according to an exemplary embodiment of the present disclosure.

Since the swirl is weakened at the end of the intake stroke by the chamfers 130 according to an exemplary embodiment of the present disclosure, at the time of injecting fuel, a sufficient combustion time can be secured, and nitrogen oxides as well as smoke can be reduced.

Further, if the multiple intake ports 120 are formed in the single combustion chamber 170, the offset direction D of the chamfer 130 formed at each intake port 120 may have various differences in angle along a rotation direction of a swirl.

Furthermore, the engine intake port according to the present disclosure may be applied to a low swirl engine which is not equipped with a diesel particulate filter (DPF).

Meanwhile, a valve sheet unit 150 is provided at an end corner of the intake port 110 on a side of the combustion chamber. When the intake port 110 is closed by the valve unit 160, the valve sheet unit 150 is brought into close contact with the valve unit 160 so as to maintain airtightness.

Otherwise, the chamfer 130 may be formed at the valve sheet unit 150 so as to be inclined and offset with respect to the valve sheet unit 150. Further, in some cases, the chamfer 130 may be provided by rotating the chamfer 130 toward a direction of the valve sheet unit 150 such that an inclination direction of the chamfer 130 can be changed.

Cycles of increase and decrease in an inclination angle of the chamfer 130 may continuously alternate, and an inclined plane of which an inclination angle increases and decreases along a circumferential direction of the valve sheet unit 150 may be formed at the chamfer 130.

Therefore, the inclined plane of the chamfer 130 may have a gentle surface on one side and a steep surface on the other side. On the gently inclined side, air smoothly flows, whereas on the steeply inclined side, a flow of air may be limited.

According to another exemplary embodiment of the present disclosure, the gently inclined surface of the chamfer 130 may be set to head for a flow direction of intake air through the intake port 110. Further, in order to adjust a level of strengthening a swirl by determining an operation state of the engine, the valve sheet unit 150 may be reassembled, and, thus, the inclination direction of the chamfer 130 may be adjusted.

The chamfer 130 may be installed such that the gently inclined surface of the chamfer 130 heads for the opposite direction to the flow direction of intake air through the intake port 110 and the steeply inclined surface heads for the flow direction of intake air, and, thus, air escaping from the intake port 110 bumps against the steeply inclined surface of the chamfer 130 and inhibits formation of a swirl, thereby reducing swirls.

The present disclosure is not limited to the above-described specific exemplary embodiments and can be modified and changed in various ways by those having ordinary skill in the art without departing from the subject matter of the present disclosure as claimed in the following claims and such changes and modifications fall within the scope of the claims.

The engine intake port structure according to the exemplary embodiment of the present disclosure weakens a swirl flow of intake air is weakened in an intake stroke, and, thus, it can be used in extending a waiting time in a combustion chamber.

The invention claimed is:

1. An engine intake port structure comprising:
a cylinder head block comprising an intake port and an exhaust port;
a valve unit installed in the cylinder head block and configured to open and close the intake port; and
a glow plug is installed at a glow plug installation hole that is formed between the intake port and the exhaust port,
wherein the intake port is provided in multiple as first and second intake ports, and the first intake port is closer to the glow plug than the second intake port,
wherein at an end corner of the first intake port, a first chamfer is formed to be offset with respect to the center of the first intake port and at an end corner of the second intake port, a second chamfer is formed to be offset with respect to the center of the second intake port,
wherein an offset direction of the first chamfer is directed to an inner wall of a combustion chamber which is spaced apart from the glow plug, and an offset direction of the second chamfer is different than the offset direction of the first chamfer, and
when the first and second intake ports are opened and closed by the valve unit, introduction of intake air is concentrated on a side in which an opening width of the first and second chamfers are wide at a beginning of an opening stage or at an end of a closing stage.

2. The engine intake port structure of claim 1, wherein when a virtual line connecting the center of the combustion chamber to the center of another adjacent combustion chamber is defined as a base line, the offset directions and of the first and second chamfers have torsion angles, respectively, with respect to the base line.

3. The engine intake port structure of claim 1, wherein the second intake port is a helical port formed in a helical direction with respect to the combustion chamber and the first intake port is a tangential port formed in a tangential direction with respect to the combustion chamber.

4. A diesel engine intake port structure which is formed to have torsion to control a swirl flow of a mixed gas, the diesel engine intake port structure comprising:
a cylinder head block comprising a first intake port outlet, a second intake port outlet adjacent to the first intake port outlet, and an exhaust port inlet;
first and second intake ports connected to the first and second intake port outlets and configured to guide air to a combustion chamber;
valve sheet units provided in the cylinder head block and installed between the first and second intake port outlets and the first and second intake ports;
a glow plug is installed at a glow plug installation hole that is formed between the first and second intake port outlets and the exhaust port inlet, and the first intake port outlet is closer to the glow plug than the second intake port outlet; and
first and second chamfers which are formed such that an inclination angle toward the combustion chamber from environs of the first and second intake port outlets is changed, wherein an offset direction of the first chamfer is directed to an inner wall of the combustion chamber which is spaced apart from the glow plug, and an offset direction of the second chamfer is different than the offset direction of the first chamfer by at least 180 degrees.

5. The diesel engine intake port structure of claim 4, wherein the first and second intake ports comprise a helical port installed in a helical shape in the cylinder head block and a tangential port arranged in a tangential direction at an edge of the combustion chamber.

6. The diesel engine intake port structure of claim 4, wherein an inclination direction of the first chamfer is twisted by 30 degrees in an anticlockwise direction based on a longitudinal direction of the cylinder head block and an inclination direction of the second chamfer is twisted by 210 degrees in the anticlockwise direction based on the longitudinal direction of the cylinder head block.

* * * * *